US012013031B2

(12) United States Patent
Lippi et al.

(10) Patent No.: US 12,013,031 B2
(45) Date of Patent: Jun. 18, 2024

(54) HYDRAULIC CLOSED CIRCUIT MOTORIZATION SYSTEM AND METHOD FOR CONTROLLING THE DRIVING OF A TRANSPORT VEHICLE

(71) Applicant: Faymonville Distribution AG, Waisswampech (LU)

(72) Inventors: Fabrizio Lippi, Waisswampech (LU); Willian D'Agostino, Waisswampech (LU); Alexander Fickers, Waisswampech (LU)

(73) Assignee: FAYMONVILLE DISTRIBUTION AG, Waisswampech (LU)

( * ) Notice: Subject to any disclaimer, the term of this patent is extended or adjusted under 35 U.S.C. 154(b) by 168 days.

(21) Appl. No.: 17/565,997

(22) Filed: Dec. 30, 2021

(65) Prior Publication Data

US 2022/0228661 A1    Jul. 21, 2022

(30) Foreign Application Priority Data

Jan. 20, 2021 (IT) .................. 102021000000953

(51) Int. Cl.
*B60K 17/14* (2006.01)
*B60K 17/356* (2006.01)
(Continued)

(52) U.S. Cl.
CPC ......... *F16H 61/4192* (2013.01); *B60K 17/14* (2013.01); *B60K 17/356* (2013.01);
(Continued)

(58) Field of Classification Search
CPC .. F16H 61/4192; F16H 39/02; F16H 61/4017; F16H 61/44; B60K 17/14; B60K 17/356
(Continued)

(56) References Cited

U.S. PATENT DOCUMENTS 4,779,417 A * 10/1988 Kita ................. F16H 61/4026
60/486
6,853,900 B2 * 2/2005 Rapp .................. F16H 61/061
701/64
(Continued)

FOREIGN PATENT DOCUMENTS

| DE | 2550167 | 5/1977 |
| DE | 102016102914 | 5/2017 |
| WO | 2014006302 | 1/2014 |

OTHER PUBLICATIONS

Italian Search Report and Written Opinion dated Oct. 7, 2021, in connection with Italian Application No. IT202100000953 (8 pages).

*Primary Examiner* — James A Shriver, II
*Assistant Examiner* — Hilary L Johns
(74) *Attorney, Agent, or Firm* — Klintworth & Rozenblat IP LLP

(57) ABSTRACT

A transport vehicle is driven by a hydraulic closed circuit system having a variable displacement pump to send an operating fluid to a delivery branch and receive the operating fluid from a return branch, a plurality of hydraulic motors connected to the delivery branch and to the return branch in order to drive relative wheels of the vehicle, a command and control unit to control the pump and the hydraulic motors in an ordinary advancing condition of the vehicle and command and control unit, which is configured to intervene in case of faults or malfunctions of the pump and to control a valve so as to establish a connection between the delivery branch and the return branch regardless of the control of the command and control unit of the pump and of the hydraulic motors.

13 Claims, 6 Drawing Sheets

(51) Int. Cl.
    *F16H 39/02*         (2006.01)
    *F16H 61/4017*     (2010.01)
    *F16H 61/4192*     (2010.01)
    *F16H 61/44*        (2006.01)

(52) U.S. Cl.
    CPC ......... *F16H 39/02* (2013.01); *F16H 61/4017* (2013.01); *F16H 61/44* (2013.01)

(58) Field of Classification Search
    USPC .......................................................... 180/307
    See application file for complete search history.

(56) References Cited

U.S. PATENT DOCUMENTS

| | | | |
|---|---|---|---|
| 8,794,003 B2* | 8/2014 | Mauran | F01K 25/04 60/645 |
| 2002/0094909 A1* | 7/2002 | Gluck | F16H 61/461 477/52 |
| 2008/0210505 A1* | 9/2008 | Vigholm | E02F 9/2296 188/266.2 |
| 2009/0260911 A1* | 10/2009 | Nozaki | F16H 61/4043 180/307 |
| 2011/0167825 A1* | 7/2011 | Mauran | F01K 27/005 60/670 |
| 2015/0075146 A1* | 3/2015 | Bedert | B60W 30/18109 60/327 |
| 2019/0211924 A1 | 7/2019 | Tollefsrud et al. | |

\* cited by examiner

HYDRAULIC CLOSED CIRCUIT MOTORIZATION SYSTEM AND METHOD FOR CONTROLLING THE DRIVING OF A TRANSPORT VEHICLE

CROSS-REFERENCE TO RELATED APPLICATIONS

This patent application claims priority from Italian Patent Application No. 102021000000953 filed on Jan. 20, 2021, the entire disclosure of which is incorporated herein by reference.

TECHNICAL FIELD

The invention relates to a hydraulic closed circuit motorization system and method for controlling the driving of a transport vehicle.

BACKGROUND ART

For the transport of heavy loads ranging from some dozens to thousands of tons, in general, and of special loads having a large height extension, in particular, transport vehicles are used, which are motorized by means of a hydraulic closed circuit system having a main hydraulic pump and a plurality of hydraulic motors for driving wheels of tracks.

An example of a known hydraulic system of the type described above is shown in FIG. 8.

The system comprises a variable-displacement hydraulic pump operated by a heat engine or by an electric motor K1 and a plurality of hydraulic motors M1, M2, . . . Mn, which also have a variable or fixed displacement, are connected to a delivery branch A and to a return branch B and have respective output shafts, each connected to a relative wheel or track of the vehicle in a direct manner or by means of dedicated mechanical transmissions.

The pump P is protected from possible pressure peaks by a protection or bypass circuit having, for each branch, a respective maximum pressure-relief valve, indicated with C1. The pressure-relief valves C1 are set to a threshold value predefined by the pump manufacturer—and in the range of four hundred and fifty bars—and, once they have reached it, allow the oil flow to partially bypass the pump P so as not to exceed a rated maximum inner pressure of the pump P.

Upon pickup, in ordinary advancing conditions of the vehicle, the pump P has its minimum displacement and the hydraulic motors M have their maximum displacement. In this case, the vehicle is capable of picking up even in the presence of steep slopes or significant resistances to the advancing thereof, which can depend on particular states or conditions of the ground. As the speed increases, just like gear ratios are changed in mechanical transmission systems, by similarly acting upon the displacements of the pump P and of the motors M, a running speed or maximum speed possible is reached, at which the displacement of the pump P reaches its maximum level and the displacement of the motors M reaches its minimum value.

If everything was sized in a correct manner, the motor K1 operating the pump P will also be in conditions close to its power limit.

Known hydraulic motorization systems described above, despite keeping accelerations, decelerations and maximum pressure values of the system within defined and desired limits by carrying out a simultaneous and synchronized control of the displacement of the pump P and of the motors M1, M2, Mn, are scarcely satisfactory, as they are not capable of properly responding in emergency conditions deriving from unforeseeable faults, such as, for example, a sudden fault of the system controlling the displacement of the pump P, a sudden failure of the motor K1 operating the pump P or the breaking of the pump P.

Indeed, if, for example, the displacement P of the pump abruptly decreases, the inertia action of the whole system tries to remain in the immediately previous state and this leads to a motoring over of the hydraulic motors M and, simultaneously, given how quick the phenomenon is, the pressure in the return branch increases, since the system is braking. The braking increases in terms of torque until the maximum protection system of the pump, specifically 450 bar, is reached.

This pressure level is quickly reached and, consequently, the vehicle is slowed down in an equally quick manner. Because of the quickness of the event, the calibration limit value of the pressure-relief valves could be exceeded, thus causing unexpected and dangerous stresses to the system. The pressure-relief valves C1 are capable of dampening possible pressure peaks deriving from a use in ordinary conditions, but, in a condition of instantaneous closing of the pump P, they could no nothing but laminate oil between the delivery branch and the return branch at the maximum calibration pressure and, consequently, produce a significant braking action on the vehicle.

Hence, in general, when one of the aforesaid faults occurs, the control of the vehicle is lost without having the chance to put in place suitable braking actions to protect the vehicle and the transported load.

The problem discussed above is extremely amplified in case the vehicle transports a load having a higher centre of gravity, which is what happens, for example, during the transport of tubular cylindrical bodies for launch vehicles or wind turbines, which, in some cases, are transported in a vertical position.

Indeed, in particular, a failed prompt control of the vehicle causes load stability problems, in some cases, and the damaging of the load itself when it is particularly fragile, in other cases, for the load and the vehicle are inevitably subjected to significant dynamic overloads since high transported masses correspond to large inertia actions.

In any case, in the presence of a failure, all necessary and expected load safety conditions become null.

DISCLOSURE OF INVENTION

The object of the invention is to provide an emergency unit for a hydraulic closed circuit motorization system for a transport vehicle, which solves the problems discussed above in a simple and economic fashion.

In particular, the object of the invention is to provide an emergency unit for a hydraulic closed circuit motorization system for a transport vehicle, which ensures a prompt and effective control of the movements of the vehicle in case of a sudden failure of any one of the driving or control components of the hydraulic circuit.

According to the invention, there is provided an emergency hydraulic unit for a hydraulic closed circuit motorization system for a transport vehicle; the hydraulic circuit comprising at least a motorized pump for sending pressurised fluid in a delivery branch and for receiving the fluid from a return branch of the hydraulic circuit; the unit being characterised in that it comprises:

pressure detection means for detecting the pressure in the delivery branch and in the return branch and for outputting respective electric signals;

an emergency solenoid valve designed to be connected to the delivery branch, on one side, and to the return branch on the other side;

a command and control unit in emergency conditions configured to receive said electric signals from said pressure detecting means and connected to said solenoid valve to switch the solenoid valve between an open position, in which it directly connects the delivery branch with the return branch, and a closed position in which it hydraulically isolates the delivery branch and the return branch; said command and control unit in emergency conditions comprising:

first computation means for calculating the difference between the delivery pressure and the return pressure;

second computation means for calculating, during the advancing of the vehicle, an instantaneous first derivative as a function of the time of said pressure difference;

comparator means for comparing the instantaneous first derivative with a value of the first reference derivative; and actuator means for commanding said solenoid valve to open when a deviation between the value of the instantaneous first derivative and the value of the first reference derivative occurs.

The invention further relates to a hydraulic closed circuit motorization system for controlling the driving of a transport vehicle.

According to the invention, there is provided a hydraulic closed circuit motorization system for controlling the driving of a transport vehicle as claimed in claim 4.

The invention further relates to a method for controlling the driving of a transport vehicle.

According to the invention, there is provided a method for controlling the driving of a transport vehicle by using a hydraulic closed circuit motorization system as claimed in claim 4, the method comprising the steps of controlling the pump and the hydraulic motors by means of the general command and control unit during ordinary advancing condition of the vehicle so that the vehicle advances along the pre-planned route, and being characterised by keeping the emergency solenoid valve in a closed condition during the advancing of the vehicle in the ordinary advancing condition, and by identifying by means of the emergency control unit the instant in which failure of the pump or of the drive motor of the same pump starts and by commanding the solenoid valve to open by means of said emergency command and control unit establishing communication between the delivery branch and the return branch; identifying the instant in which failure starts, is carried out by detecting the pressures in the delivery branch and in the return branch, calculating the pressure difference between the pressures in said delivery and return branches, calculating the first derivative over time of said pressure differences and identifying a deviation of the first derivative with respect to a reference value.

Preferably, in the method defined above, the reference value is a value of the first derivative of said pressure differences detected in ordinary advancing condition of the vehicle.

Finally, the invention relates to a transport vehicle.

According to the invention, there is provided a transport vehicle as claimed in claim 13.

BRIEF DESCRIPTION OF THE DRAWINGS

The invention will now be described with reference to the accompanying figures, which show a non-limiting embodiment thereof, wherein.

BEST MODE FOR CARRYING OUT THE INVENTION

Figure 1:
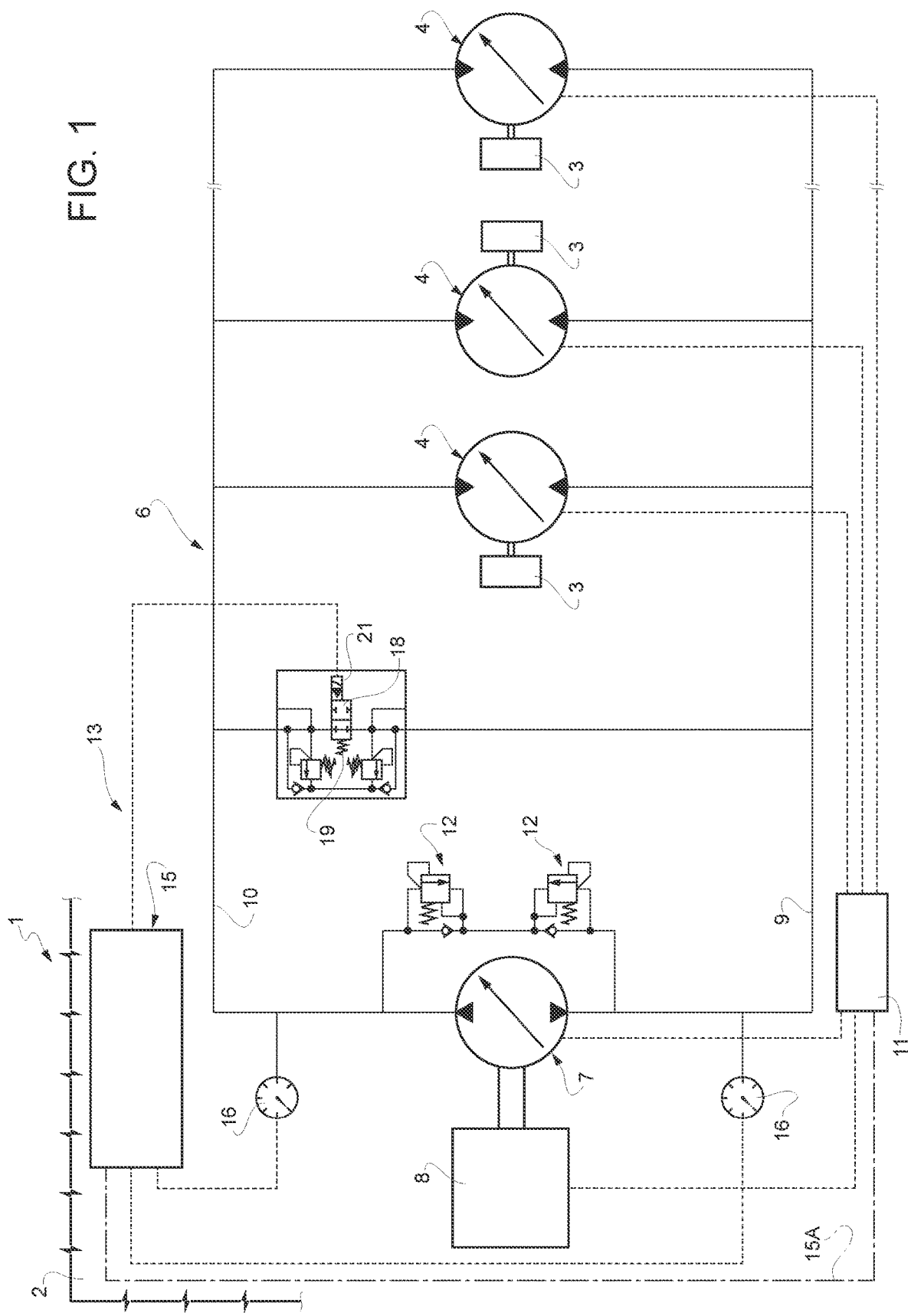
FIG. 1 schematically shows, substantially in blocks, a transport vehicle provided with a first preferred embodiment of a hydraulic closed circuit motorization system according to the invention.

In FIG. 1, number 1 indicates, as a whole, a vehicle for the transport of goods and, in particular, for the transport of heavy loads and/or high loads, such as, for example, modules for launch vehicles or wind turbines, to which explicit reference will be made in the description below without because of this loosing in generality.

The vehicle 1 comprises a frame 2 defining a loading plane and a plurality of wheels or tracks 3, which are schematically shown, are coupled to the frame 2 in a known manner and roll on the ground.

For each wheel or track 3, the vehicle 1 comprises a respective hydraulic driving motor 4, which is known and schematically shown, conveniently having a variable or fixed displacement.

The motors 4 are part of a hydraulic system 6 for driving the vehicle 1; the hydraulic system 6 is a closed circuit system and comprises, in addition to the hydraulic motors 4, a variable-displacement pump 7, which is driven by an electric motor or a heat engine of its own, indicated with 8.

According to a variant which is not shown herein, the hydraulic system 6 comprises two or more pumps 7 driven by relative motors 8.

The pump 7 and the hydraulic motors 4 are connected, in a known manner, to a delivery branch 9 and to a return branch 10 of the system 6, as visible in FIG. 1, and are controlled by a general command and control unit 11 of the vehicle 1, which is known and schematically shown. The general command and control unit 11 commands and controls the pump 7, the hydraulic motors 4 and the driving motor 8 of the pump 7 in an ordinary advancing condition of the vehicle 1.

Hereinafter, "ordinary advancing condition" indicates an advancing condition in which the pump 7 and the relative motor 8 work in a correct and efficient manner.

The system 6 further comprises, for each branch 9 and 10, a known pressure-relief valve 12, which is not described in detail, is suited to protect the pump 7 and, therefore, is set to a predetermined pressure, in the example shown herein in the range of four hundred and fifty bars. However, the value of the calibration pressure can be different from the one indicated above, since it is chosen as a function of the type of pump used.

Figure 2:
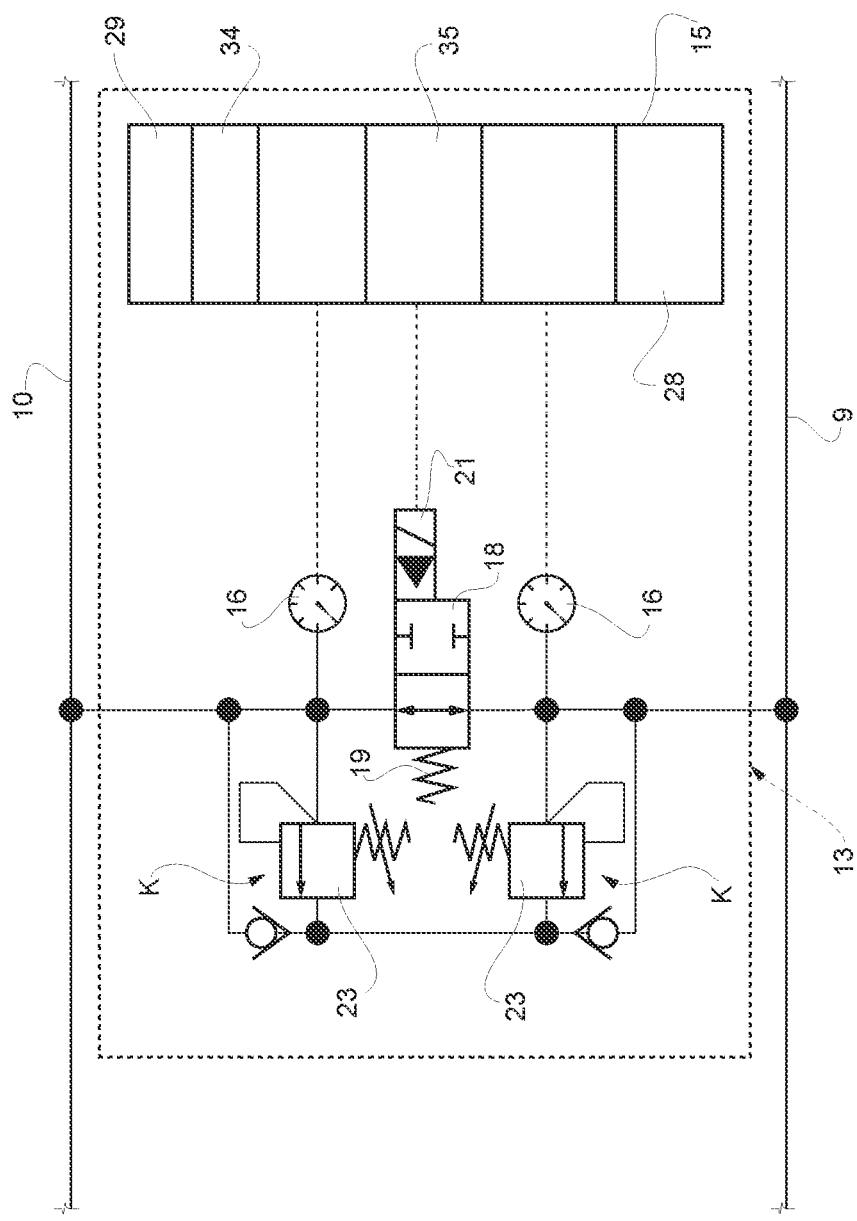
FIG. 2 shows, on a much larger scale, an emergency hydraulic unit of FIG. 1 according to the invention.

With reference to FIG. 1, again, and, in particular, to FIG. 2, the system 6 further comprises an emergency unit 13, which operates according to a logic independently of the general command and control unit 11 and intervenes when a fault or malfunction occurs in the hydraulic system 6, such as, for example, the breaking of the pump 7 or the failure of the control of the displacement of the pump 7 or even the breaking or a malfunction of the motor 8.

The emergency unit 13 comprises a command and control unit 15 of its own, which operates in emergency conditions and independently of the command and control unit 11.

The command and control unit 15 is physically separate from the unit 11, as shown in FIG. 1, and, in this case, an electric connection 15A to the general unit 11 can be provided or not be provided, for example for a diagnostic control or for setting operating parameters of the system or for synchronization activities.

Alternatively, the command and control unit 15 is partially or totally integrated in the general unit 11, but always configured so as to operate autonomously in case of emergency.

When the command and control unit 15 is physically separate from the general unit 11, the unit 13 constitutes a kit that can be installed in existing vehicles. Even in this case, and owing to the above, it is evident that some parts or blocks of the unit 13 could be arranged in general unit 11.

In any case, the unit 13 further comprises, for each branch 9, 10, a known pressure detector 16, which is designed to detect, either continuously or at predetermined time intervals, the pressure of the relative branch and to send a corresponding signal to the command and control unit 15.

The unit 13 finally comprises a two-way solenoid valve 18, which is electrically connected to the command and control unit 15 and has a port hydraulically connected to the delivery branch 9 and a port connected to the return branch 10, as shown in FIG. 1 and, in particular, in FIG. 2.

With reference to FIG. 2, again, the solenoid valve 18 is a normally open bistable solenoid valve. The solenoid valve 18 is held, by a thrust spring 19, in an opening condition of its, in which it hydraulically and directly connects the delivery branch 9 to the return branch 10, basically setting the vehicle to a "neutral driving" state equivalent to the "neutral gear" of wheeled road vehicles.

The solenoid valve 18 is switched to a closing position of its, in which it isolates the delivery branch from the return branch 10, by an electric-hydraulic actuator 21, which is controlled by the command and control unit 15.

With reference to FIG. 2, again, the unit 13 further comprises, for each branch 9, 10, a pressure-relief valve 23, which is calibrated so as to protect the solenoid valve 18 and is set to the maximum pressure the solenoid valve can bear, in the example described herein a pressure of 420 bar.

The operation of the system 6 will now be described starting from an advancing situation of the vehicle 1 in an ordinary advancing condition, in which the solenoid valve 18 is held in a closing condition by the command and control unit 15 and the general command and control unit 11 commands and control the displacement of the pump and of the hydraulic motors 4, when they have a variable displacement, and of the motor 8 in order to advance the vehicle 1 along the provided advancing path.

Starting from this condition, if the pump 7 and the relative motor 8 do not suffer from failures, namely if they work correctly, the general command and control unit 11 controls the pump 7 and the hydraulic motors 4 by changing their displacement so as to advance the vehicle 1 along the provided path and with the provided law of motion.

Figure 4:
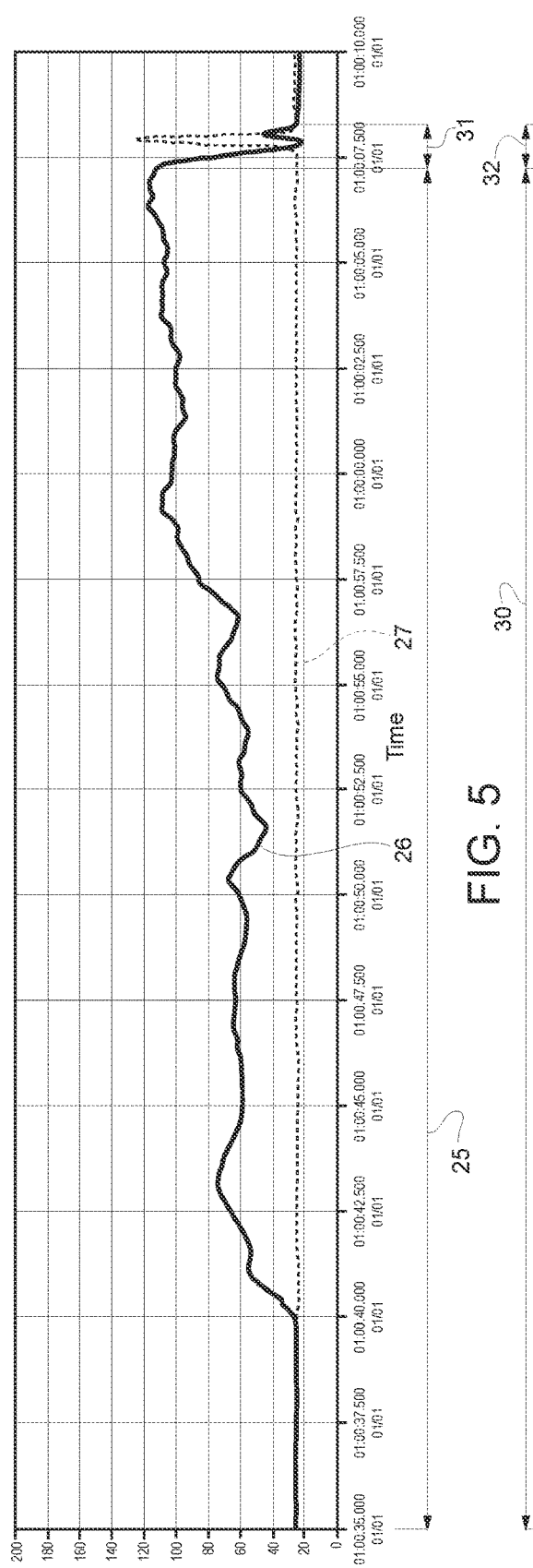
FIG. 4 shows the development of the pressures, as a function of time, in a delivery branch and in a return branch of the system of FIGS. 1 and 2 in case a sudden failure of a component of the system occurs.

During this advancing, the pressures in the delivery branch 9 and in the return branch 10 change over time with a law of motion represented in segment 25 of the diagram of FIG. 4, wherein 26 indicates the development in the delivery branch 9 and 27 indicates the pressure development in the return branch 10.

During said advancing, again, the command and control unit 15 receives signals that are proportional to the pressures in the delivery branch 9 and in the return branch 10 and processes said data holding the solenoid valve 18 in its closing condition. I In particular, during the advancing of the vehicle 1, the command and control unit 15 calculates, in an almost continuous manner or at predetermined time intervals and by means of a computation block 28 (FIG. 2), the difference D between the pressure in the delivery branch 9 and the pressure in the return branch 10.

During the advancing of the vehicle 1, again, by means of a further computation block 28, the command and control unit 15 calculates the first derivative of the pressure difference D calculated by the block 28 as a function of time. The development of the first derivative of the pressure difference D is represented by segment 30 of the diagram of FIG. 5.

As shown by a closer analysis of segment 30, the first derivative of the pressure difference D oscillates in the neighbourhood of zero, remaining within a narrow range R, which, in the case described herein, ranges from circa 20 to circa −20 bar/s. The range R can be set and changed through the command unit 15 and, if necessary, communicated to the general unit 11 or it can be communicated to the unit 15 by the general unit 11, in any case through the connection 15A.

When, for whatever reason, a failure arises in the system 13 affecting the pump 7 or its motor 8, for example the pump 7 quickly reaches its closing position or the relative motor 8 does not operate the pump 7 any longer in the expected manner, the pressure in the delivery branch 9 suddenly decreases and, at the same time, the pressure in the return branch 10 suddenly increases due to the inertia of the vehicle 1, which causes the rotation of the hydraulic motors 4.

Figure 6:
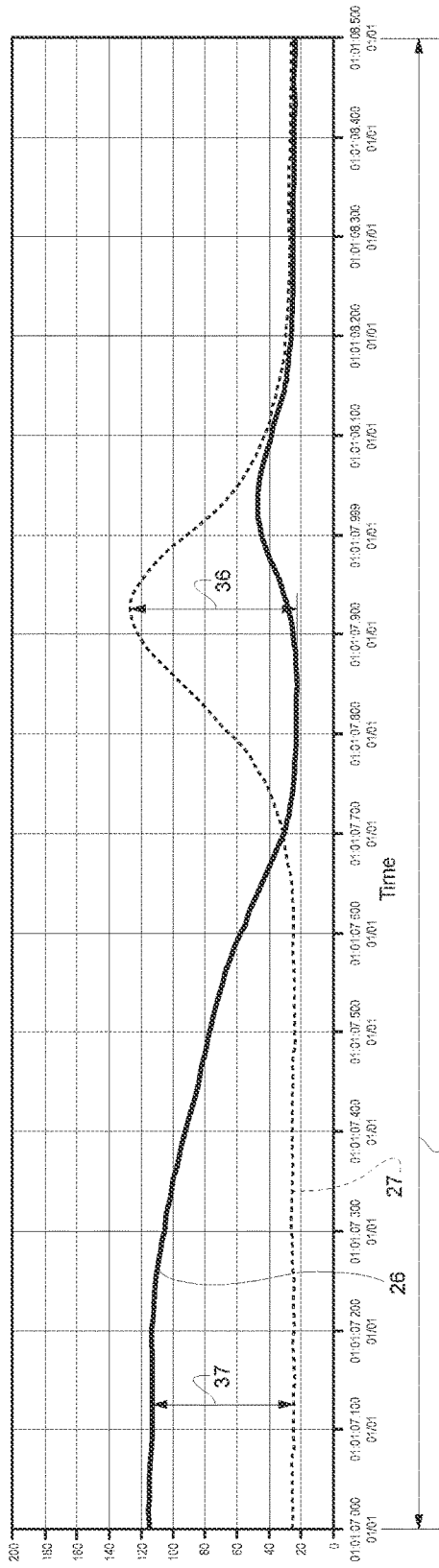
FIGS. 6 and 7 show, on a much larger scale, a segment of the diagram of FIG. 4 and a segment of the diagram of FIG. 5, respectively.

The situation described above is represented by segment 31 of the diagram of FIG. 4 and, on a larger scale, in the diagram of FIG. 6, wherein the development of the pressure P9 in the delivery branch 9 is represented by curve 26 and the development of the pressure P10 in the return branch 10 is represented by curve 27.

In this situation, the command and control unit 15 intervenes and, operating in the way described above, detects a sudden change in the first derivative of the pressure difference D. This sudden change is shown in segment 31 of FIG. 5 and, on a larger scale, in FIG. 7.

Figure 5:
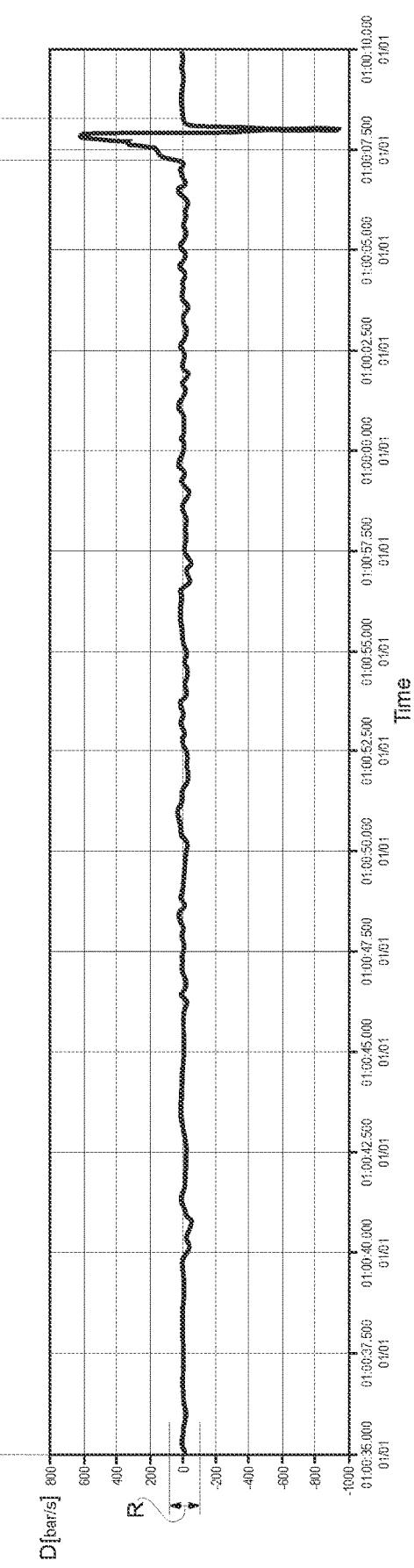
FIG. 5 is a diagram showing the development, as a function of time, of the derivative of the difference of the pressures in the delivery and return branches in case a sudden failure of the system occurs.

According to FIG. 5, in the presence of the failure, the first derivative of the difference D reaches both positive and negative values that exceed 600 bar/s and, hence, are extremely distant from the limit values of the range R. In this situation, the command and control unit 15, by means of a comparator block 34 (FIG. 2), in each instant or at predetermined intervals, compares the value of the instantaneous first derivative with a reference value of the first derivative. The reference value can be chosen among values within the ordinary range R or be the limit values of the ordinary range R or even values on the outside of the range R, but very close to it.

When the value of the first derivative exceeds or is different from the reference value, the command and control unit 15, by means of a command block 35 of its, opens the solenoid valve 18, short-circuiting the delivery branch 9 and the return branch 10.

Figure 7:
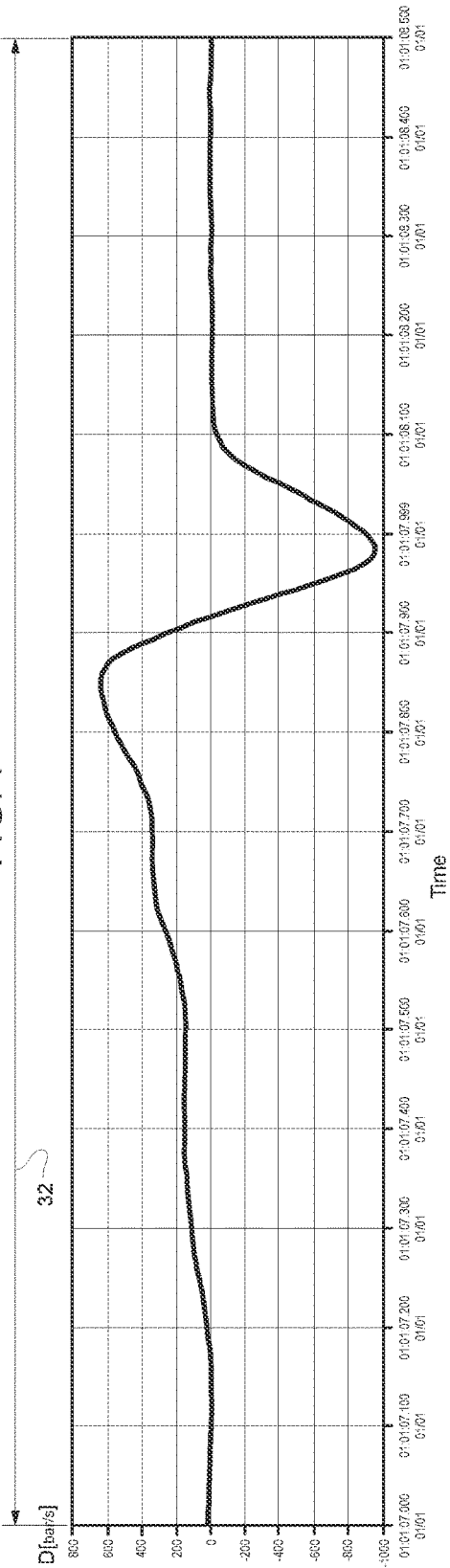
Figure 8:
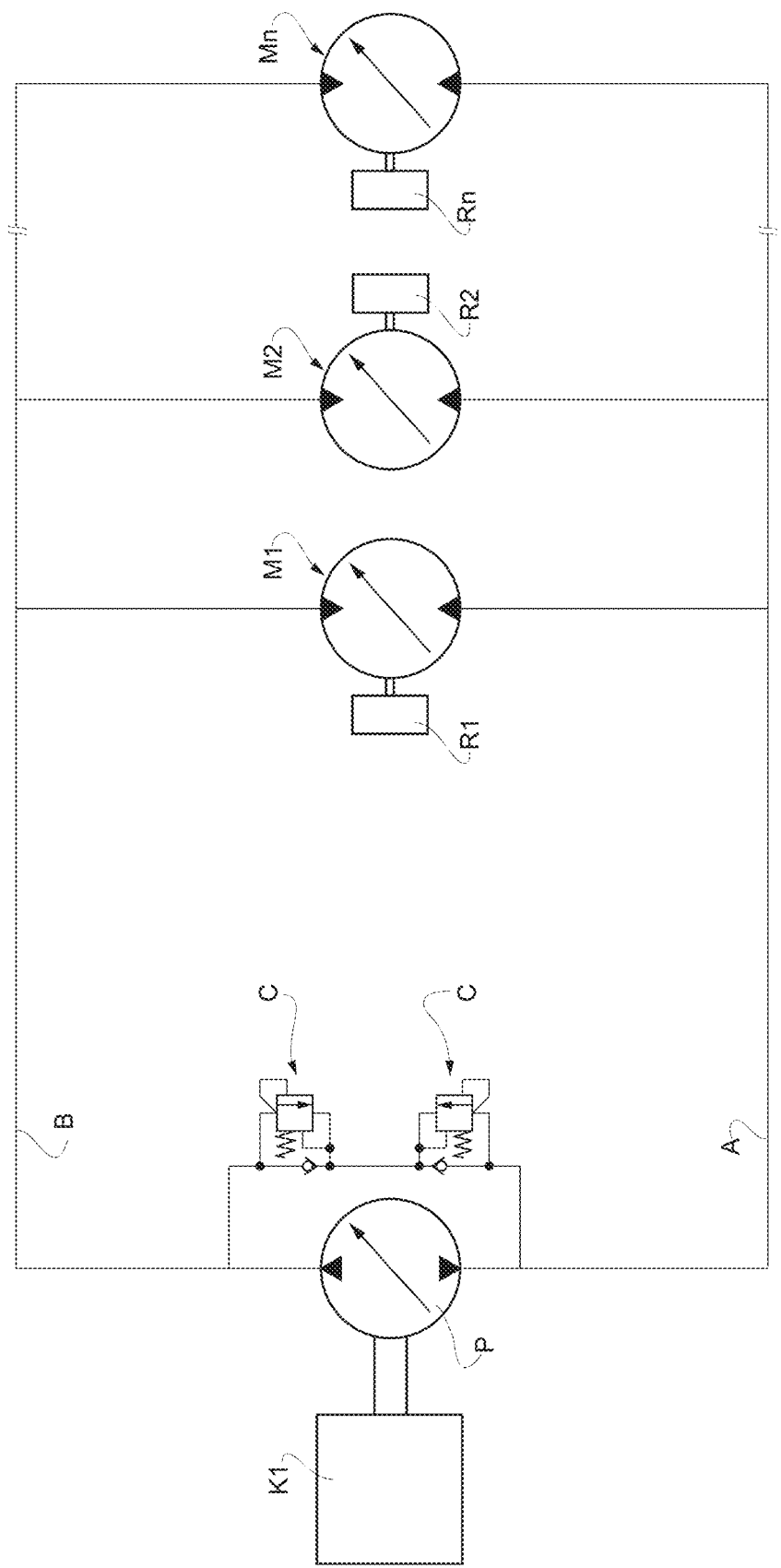
FIG. 8 schematically shows, basically in blocks, a hydraulic closed circuit motorization system for a transport vehicle according to the prior art.

With reference to FIGS. 6 and 7, it is evident how the opening of the solenoid valve 18 in the neighbourhood of the peak of the first derivative of the difference D limits the back pressure or the rising of the pressure in the return branch in the neighbourhood of 120 bar, which corresponds to a contained braking back pressure 36 comparable to the driving pressure 37 and, consequently, to small inertial actions acting upon the vehicle 1 and upon the load, which, hence, are preserved as well as the connection pipes between the pump 7 and the hydraulic motors 4 are preserved.

Examining FIGS. 6 and 7, one can see that the opening of the solenoid valves 18 at values of the first derivative of the difference D in the range of 300 bar/s leads to the generation of a braking back pressure in the return branch 10, so that no inertial action is exerted upon the vehicle and upon the relative load following the failure. In this case, the solenoid valve 18 is opened when there still is pressure in the delivery branch 9.

Owing to the above, it is evident that, by properly choosing the value of the first derivative of the pressure difference D, the braking back pressure can arbitrarily be changed, until it becomes null, regardless of the control carried out by the command and control unit 11 and, in general, of the control of the vehicle 1.

Figure 3:
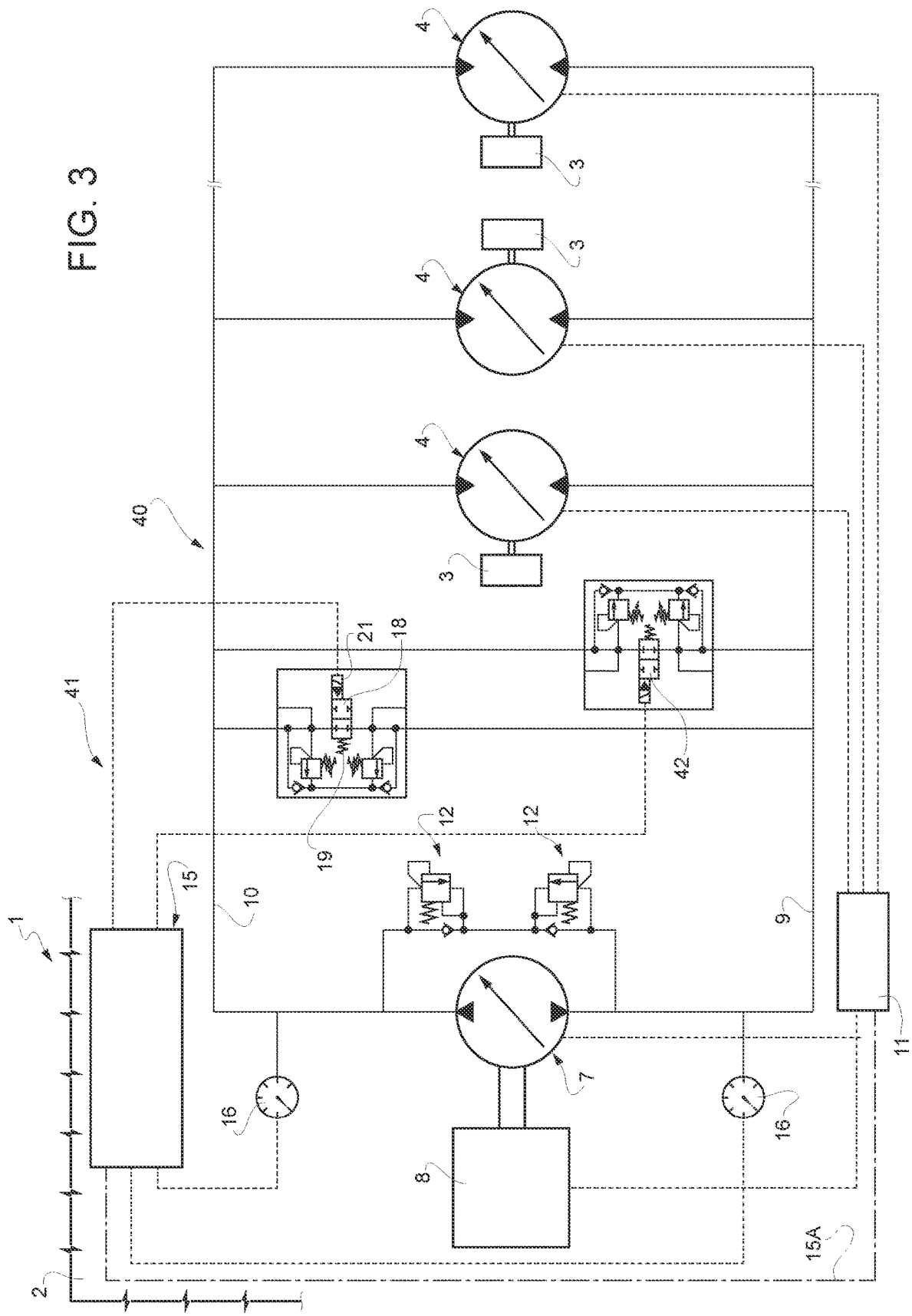
FIG. 3 is similar to FIG. 1 and shows a transport vehicle provided with a second preferred embodiment of a hydraulic motorization system according to the invention.

The variant shown in FIG. 3 relates to a system 40, which differs from the system 1 because of some manufacturing details and whose components are indicated with the same numbers as the corresponding parts of the system 1.

The system 40 comprises an emergency unit 41, which is arranged between the delivery branch 9 and the return branch 10 and operates autonomously from and independently of the command and control unit 11. The only difference between the unit 41 and the unit 13 lies in the fact that the former comprises, besides the solenoid valve 18, a further solenoid valve 42, which is connected between the delivery branch 9 and the return branch 10 in parallel to the solenoid valve 18 and is also controlled by the command and control unit 11 in order to ensure the short-circuiting of the delivery branch 9 and of the return branch 10 in case the aforesaid failures occur and in case the valve 18 does not operate as expected.

The invention claimed is:

1. An emergency hydraulic unit for a hydraulic closed circuit motorization system for controlling the driving of a transport vehicle; the hydraulic circuit comprising at least a motorized pump for sending pressurized fluid in a delivery branch and for receiving the fluid from a return branch of the hydraulic circuit, the unit comprising:
    a pressure detection means for detecting the pressure in the delivery branch and in the return branch and for outputting respective electric signals;
    an emergency solenoid valve designed to be hydraulically connected to the delivery branch, on one side, and to the return branch on the other side;
    a command and control unit in emergency conditions configured to receive said electric signals from said pressure detecting means and connected to said solenoid valve to switch the solenoid valve between an open position, in which it directly connects, in use, the delivery branch with the return branch, and a closed position in which it hydraulically isolates the delivery branch and the return branch; said command and control unit in emergency conditions comprising:
    a first computation means for calculating, the difference between the delivery pressure and the return pressure;
    a second computation means for calculating, during the advancing of the vehicle, an instantaneous first derivative as a function of the time of said pressure difference;
    a comparator means for comparing the instantaneous first derivative with a value of the first reference derivative; and
    an actuator means for commanding said solenoid valve to open when a deviation between the value of the instantaneous first derivative and the value of the first reference derivative occurs.

2. The unit according to claim 1, further comprising a further emergency solenoid valve, said emergency solenoid valves being designed to be connected in parallel to said delivery and return branches and both being controlled by said command and control unit in emergency conditions.

3. The unit according to claim 1, wherein said emergency solenoid valve is a two-way bistable valve.

4. A hydraulic closed circuit motorization system for controlling the driving of a transport vehicle comprising bodies rolling on the ground; the hydraulic system comprising at least one variable-displacement pump for sending an operating fluid in a delivery branch and receiving the operating fluid from a return branch of the system, at least one motor for driving the main pump, a plurality of hydraulic motors connected to the delivery branch and to the return branch and actuating said rolling bodies and a general command and control unit for controlling said pump and said hydraulic motors in an ordinary advancing condition of the vehicle and moving the vehicle along a pre-planned advance route; characterized in that it furthermore comprises a hydraulic emergency command and control unit comprising:
    a pressure detection means for detecting the pressure of the delivery branch and of the return branch and for outputting respective electric signals;
    an emergency solenoid valve interposed between said delivery branch and said return branch; and
    a command and control unit in emergency conditions configured to receive said electric signals from said pressure detecting means and to switch the solenoid valve between an open position in which it directly connects the delivery branch with the return branch, and a closed position in which it hydraulically isolates the delivery branch and the return branch; said command and control unit in emergency conditions comprising:
    a first computation means for calculating the difference between the delivery pressure and the return pressure;
    a second computation means for calculating, during the advancing of the vehicle, an instantaneous first derivative as a function of the time of said pressure difference;
    a comparator means for comparing the instantaneous first derivative with a value of the first reference derivative; and
    an actuator means for commanding said solenoid valve to open when a deviation between the value of the instantaneous first derivative and the value of the first reference derivative occurs.

5. The system according to claim 4, wherein said general command and control unit in the ordinary advancing condition and said command and control unit in emergency conditions operate independently of one another.

6. The system according to claim 4, wherein the system comprises a further emergency solenoid valve; said emergency solenoid valves being connected in parallel to said delivery and return branches and both being controlled by said command and control unit in emergency conditions.

7. The system according to claim 4, wherein the system comprises, for each of said delivery and return branches, a first pressure-relief valve arranged to protect said pump and a second pressure-relief valve arranged to protect said solenoid valve and independent of said first pressure-relief valve.

8. A method for controlling the driving of a transport vehicle by using a hydraulic motorization system as claimed in claim 4, the method comprising the steps of controlling the pump and the hydraulic motors by means of the general command and control unit during ordinary advancing condition of the vehicle so that the vehicle advances along the pre-planned route, and being characterized by keeping the emergency solenoid valve in a closed condition during the advancing of the vehicle in the ordinary advancing condition, and by identifying by means of the emergency control unit the instant in which failure of the pump or of the drive motor of the same pump starts and by commanding the solenoid valve to open by means of said emergency command and control unit establishing communication between the delivery branch and the return branch; identifying the instant in which failure starts, is carried out by detecting the pressures in the delivery branch and in the return branch, calculating the pressure difference between the pressures in said delivery and return branches, calculating the first derivative over time of said pressure differences and identifying a deviation of the first derivative with respect to a reference value.

9. The method according to claim 8, wherein said reference value is a value of the first derivative of said pressure differences detected in ordinary advancing condition of the vehicle.

10. The method according to claim 8, wherein the emergency solenoid valve is brought to its open condition before the pressure in the delivery branch becoming null.

11. The method according to claim 8, wherein the emergency solenoid valve is brought to its open condition before the pressure in the return branch is raised.

12. The method according to claim 8, wherein identifying the instant of failure and the opening of said emergency solenoid valve are carried out independently of the normal control of the pump and of the hydraulic motors by the general command and control unit in ordinary advancing conditions of the vehicle.

13. A motorized vehicle for the transport of goods comprising a frame, a plurality of rolling bodies coupled to the frame and a hydraulic drive system of said rolling bodies, wherein said hydraulic system operates according to the method of claim 8.

* * * * *